(12) United States Patent
He et al.

(10) Patent No.: US 7,373,028 B2
(45) Date of Patent: May 13, 2008

(54) POLARIZATION MAINTAINING COUPLER

(75) Inventors: Jian He, San Jose, CA (US); Ping Xie, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 61 days.

(21) Appl. No.: 10/693,613

(22) Filed: Oct. 24, 2003

(65) Prior Publication Data

US 2004/0223678 A1 Nov. 11, 2004

Related U.S. Application Data

(60) Provisional application No. 60/422,212, filed on Oct. 30, 2002, provisional application No. 60/422,210, filed on Oct. 30, 2002.

(51) Int. Cl.
  *G02B 6/00* (2006.01)
(52) U.S. Cl. ............... 385/11; 385/27; 385/31
(58) Field of Classification Search ............ None
  See application file for complete search history.

(56) References Cited

U.S. PATENT DOCUMENTS

| | | | |
|---|---|---|---|
| 6,040,944 A * | 3/2000 | Pan et al. ............... | 359/590 |
| 6,292,604 B1 * | 9/2001 | Cheng .................... | 385/24 |
| 6,331,913 B1 * | 12/2001 | Huang et al. ............ | 359/497 |
| 6,411,749 B2 * | 6/2002 | Teng et al. .............. | 385/11 |
| 6,529,325 B1 * | 3/2003 | Kokkelink et al. ....... | 359/497 |
| 6,782,146 B2 * | 8/2004 | Hellman et al. .......... | 385/11 |
| 6,860,644 B2 * | 3/2005 | Gage et al. .............. | 385/74 |
| 2002/0110307 A1 * | 8/2002 | Huang et al. ............ | 385/11 |
| 2003/0223670 A1 * | 12/2003 | Nikolov et al. .......... | 385/11 |

\* cited by examiner

*Primary Examiner*—Sung Pak
(74) *Attorney, Agent, or Firm*—Workman Nydegger

(57) ABSTRACT

A polarization maintaining coupler is provided that allows a user to change the coupling ratio of two or more output fibers. The coupler can include an assembly containing a PM fiber in a ferrule. The ferrule is attached to a housing, which includes a lens for collimating light from the PM fiber onto an optical component that splits the incoming polarized light into two orthogonally polarized components. Each of these orthogonal components is then output into a separate PM or single mode fiber. By rotating the input PM fiber with respect to the optical component, the coupling ratio of the output fibers can be changed. This change in the coupling ratio can be accomplished either by rotating the input PM fiber, or by rotating the optical component together with the output fibers.

37 Claims, 3 Drawing Sheets

POLARIZATION MAINTAINING COUPLER

CROSS-REFERENCE TO RELATED APPLICATIONS

This application claims priority to and the benefit of U.S. Provisional Patent Application No. 60/422,212, filed on Oct. 30, 2002 and entitled "Polarization Maintaining Coupler", and 60/422,210, filed on Oct. 30, 2002 and entitled "Polarization Dependent Loss Loop", both of which are incorporated herein by reference in their entireties.

BACKGROUND OF THE INVENTION

1. The Field of the Invention

The present invention relates to the field of fiber optic couplers, and more specifically, to polarization maintaining fiber optic couplers that provide for an adjustable coupling ratio.

2. The Relevant Technology

The field of fiber optic communications has enjoyed rapid growth over the last decade. As data transfer rates increase, more and more information is being compressed into currently available fiber optic lines. This need for speed has resulted in a corresponding need for equipment to precisely and accurately transmit large amounts of data over great distances with little or no data loss. One method of maximizing the efficiency of transmission is to transmit signals with a well maintained state of polarization.

As light signals propagate over long distances, the signals will be attenuated due to losses in the optical fiber such as scattering losses and absorption losses. Reduced signal strength often results in high bit error rate, a significant system impairment. To counter signal propagation losses in the optical fiber, optical amplifiers are often used to boost the signal strength. One popular optical amplifier is a Raman amplifier, which has a very low signal to noise ratio and reasonable amplification (20 dB). Since Raman amplification has a polarization dependent gain, a polarization controller is often used to combine two orthogonally polarized pumps for the laser light. Optical couplers, polarization beam splitters and combiners, and polarization maintaining (PM) fibers are all useful for this purpose.

A cross-section of an exemplary prior art PM fiber is illustrated in FIG. 1, and designated generally as 100. PM fiber 100 has a core 102 surrounded by a cladding 104, which is further covered in a protective sheath 106. Stress rods 108 are located on either side of core 102 within cladding 104. An optical axis 110, passing through stress rods 108, cladding 104 and core 102, indicates one direction of the polarization maintaining axis for PM fiber 100. The other polarization maintaining axis is perpendicular to axis 110. PM fiber 100 works by placing stresses on fiber core 102, creating two perpendicular transmission axes. If linearly polarized light is input into fiber 100 along one of these axes, the polarization state is maintained for the length of fiber 100. There are various types of PM fibers widely available in the market today, including panda, bow-tie, as shown in FIG. 1, and tiger.

PM fibers are often used in an angled physical contact (APC) connector. APC connectors have fiber ends that are terminated and polished at an angle. This angle can be anywhere from a few degrees to about 15 degrees. When compared with a normal physical contact (PC) connector, which has a dome shaped endface, an APC connector exhibits better reflectance properties, because the angled and polished end surface reduces the amount of light reflected back into the fiber at the connector interface. There are various types of connectors available with an angled and polished endface including, for example, SC, ST, FC, LC, MU, MT, and MTP™.

A fiber optic coupler is an optical component that either splits light coming from one input optical fiber into two or more output optical fibers or combines two or more input beams into a single output beam. Polarization maintaining couplers use PM optical fibers. These couplers and fibers split or combine light signals according to the state of polarization of the light passing through them. PM couplers can be used in an optical communications system, such as a Raman amplifier, to provide amplification to the optical signal. PM couplers can also be used as multiplexers and de-multiplexers to combine signals from different fibers into one fiber or split signals from one fiber to other fibers. In one application, a PM coupler is used to combine two light beams input from different optical fibers into a single optical fiber. This type of coupler can be known as a polarization beam combiner. Alternately, a polarizing beam splitter is a coupler that takes an input light beam, splits it into two orthogonally polarized beams, and outputs oz each of these beams into a separate optical fiber.

A basic design for a system employing a polarizing beam splitter is shown in FIG. 2 and designated generally as 200. Input fiber 202 transmits an input light beam into polarizing beam splitter (PBS) 204. The input beam can be a beam with any state of polarization, such as a beam that has traveled some distance along a single mode fiber. Alternately, the beam can be a polarized beam from a PM fiber. In either case, the input beam is split into two orthogonally polarized output beams in PBS 204.

The two output beams can be polarized, for example, in the horizontal and vertical directions, respectively. They can then be received by respective PM fibers 206 and 208. PBS 204 can send an input beam either to PM fiber 206 or PM fiber 208, or to both of them, depending on the polarization state of the input beam, i.e. whether a beam is oriented with horizontal or vertical polarization axes. For example a horizontally polarized input beam would be directed by PBS 204 into PM fiber 208, while a vertically polarized input beam would be directed by PBS 204 into PM fiber 206. For an input beam with a polarization direction in between, the input beam will be split into two beams having orthogonal polarization, which are directed into PM fibers 206 and 208. Each beam is a projective component of the input polarization light onto the vertical and horizontal axes.

Light input from a single mode fiber can have random polarization. The amount of light that is transmitted into each of the output fibers is determined by the state of polarization of the input light. The relationship between the input and output is known as the coupling ratio. Coupling ratio or splitting ratio can be defined as the ratio of the optical power from one output port of the coupler to the sum of the total power from all output ports. The coupling ratio of an output fiber can be measured at a center wavelength and is often expressed as a percentage as follows:

$$R = 100 \frac{P_x}{\sum_{i=0}^{n} P_i} \quad (1)$$

where R is the coupling ratio, $P_x$ is the power in any one output fiber and the denominator is the sum of the power in all of the output fibers.

One problem with the system described above is that changing the coupling ratio to generate a specific amount of power in a given output fiber can be very difficult. It requires that additional equipment or optical elements be included, thus greatly increasing the cost of the system.

BRIEF SUMMARY OF THE INVENTION

What is needed is a system and method to adjust the coupling ratio to a desired level without the need for any additional components. Such a system and method are disclosed herein.

A polarization maintaining coupler is provided that allows a user to change the coupling ratio of two or more output fibers. The coupler includes an assembly containing a PM fiber in a ferrule. The ferrule is attached to a housing, which includes a lens for collimating light from the PM fiber onto a polarization beam splitter (PBS). The PBS splits the incoming polarized light into two orthogonally polarized components. Each of these orthogonal components is then output into a separate PM fiber or single mode fiber. By rotating the input PM fiber with respect to the PBS, the coupling ratio of the output fibers can be changed. This change in the coupling ratio can be accomplished either by rotating the input PM fiber, or by rotating both the PM fiber and the PBS.

These and other objects and features of the present invention will become more fully apparent from the following description and appended claims, or can be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

Figure 1:
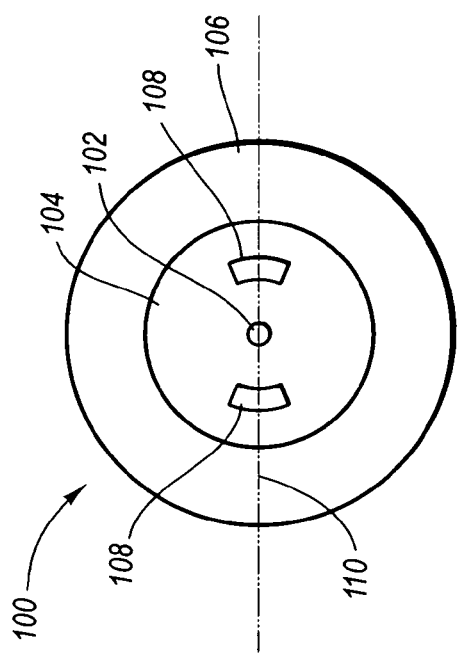
FIG. 1 is a cross sectional view of a prior art polarization maintaining fiber.
Figure 2:
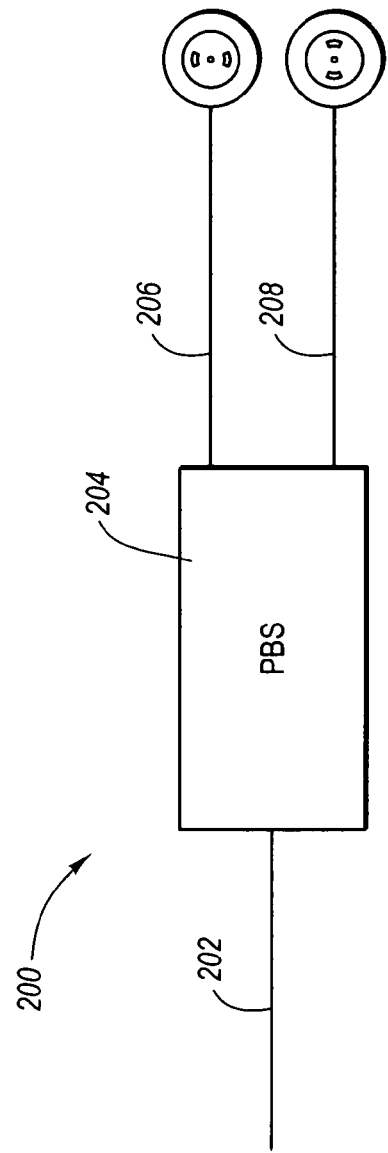
FIG. 2 is a prior art schematic view of a coupler.
Figure 3:
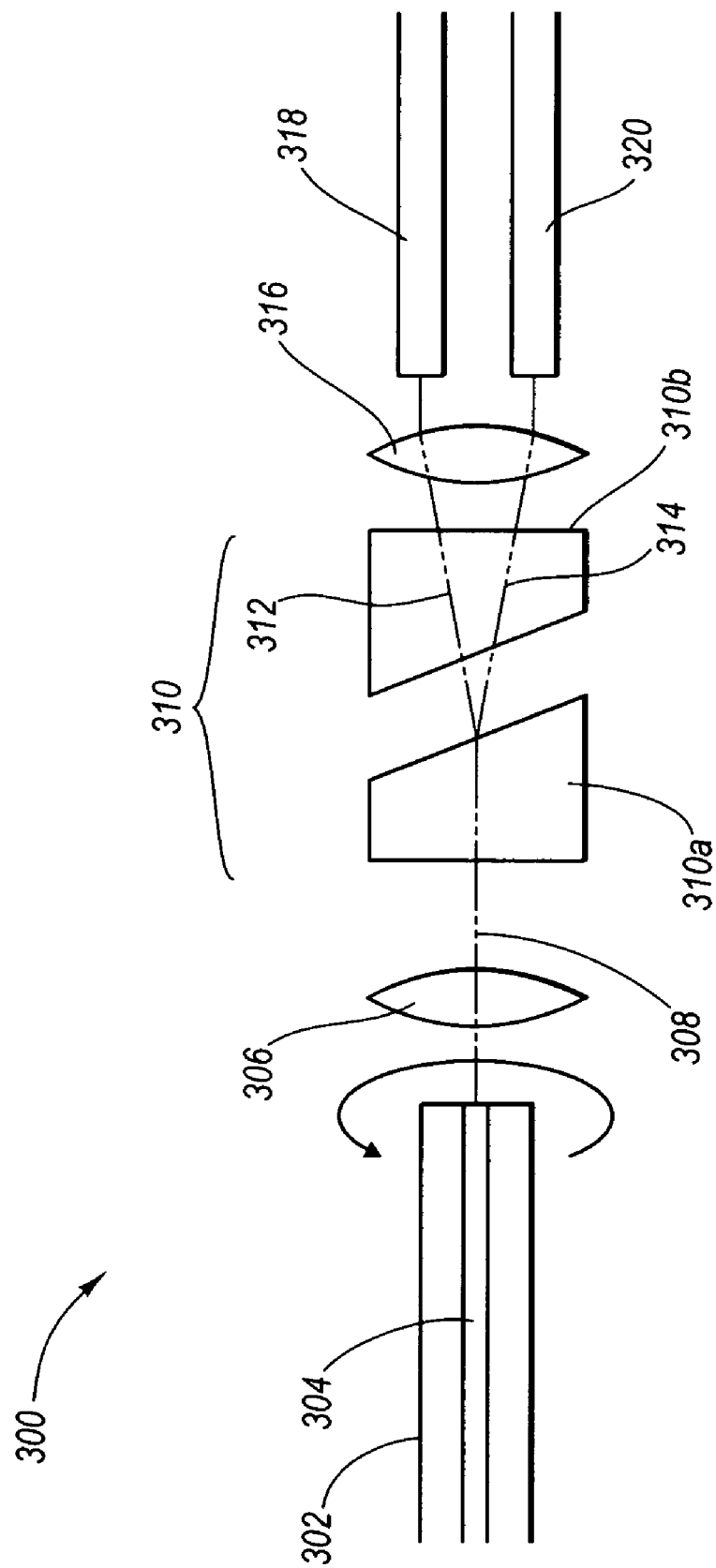
FIG. 3 is an illustration of a coupler according to one aspect of the present invention.

The present invention relates to a polarization maintaining (PM) coupler, and a system for using the PM coupler to adjust a coupling ratio between two or more output fibers. A schematic view of one exemplary coupler system is shown in FIG. 3, and designated generally as 300. System 300 includes an input PM fiber 304, disposed in a ferrule 302. A lens 306 can be used to focus a light beam 308 onto an optical component 310. Optical component 310 can be, for example, one or more polarizing beam splitters (PBS) or birefringent crystals. Optical component 310 splits incoming beam 308 into two orthogonally polarized output beams 312 and 314. Beam 312 is focused by a second lens 316 onto a first output fiber 318, while beam 314 is focused by lens 316 onto a second output fiber 320. The relative positions of lenses 306, 316, optical component 310, and output fibers 318, 320 can all be adjusted to ensure that incoming beam 308 and output beams 312, 314 are all focused onto the respective optical components.

In prior art systems, the optical polarization axis of PM fiber 304 is fixed with respect to lens 306 and optical component 310 and typically has a 50/50 splitting ratio. The positions of output fibers 318 and 320 are also fixed with respect to optical component 310, e.g. the planes containing the ends of output fibers 318 and 320 are in parallel with respect to the plane that contains the input light beam being split. Further, each of these polarization maintaining axes are aligned with respect to their respective output beam polarization directions. This results in a fixed coupling ratio in output fibers 318, 320.

In this manner, exemplary embodiments of the present invention facilitate breaking the polarization maintaining coupler into several subassemblies and allowing adjustable positioning of some subassembly parts with respect to other subassembly parts, while still maintaining a low overall insertion loss, but allowing the coupling ratio to be changed. In other words, a modifiable coupling ratio can be achieved by rotating the orientation of the optical axis of polarization fiber 304. Further, the relative positions of output fibers 318 and 320 are fixed at all times with respect to optical element 310 to maintain low excess insertion loss for the overall system. If optical element 310 is allowed to rotate with respect to output fibers 318 and 320, the plane the input beams are split into will be not be parallel with respect to the plane containing the ends of output fibers 318 and 320, resulting high excess insertion loss of the whole system. Low insertion losses for output fibers 318 and 320 cannot be simultaneously achieved. Specific details of the construction of an exemplary embodiment of a PM coupler are discussed below.

In exemplary embodiments of the present invention, the rotational orientation of fiber 304 is adjustable with respect to optical component 310. Optical component 310 is arranged to operate as the light splitter for incoming light beam 308 coming from input PM fiber 304. Optical component 310 splits incoming light beam 308 according to the polarization axis orientation of optical component 310 with respect to the polarization of incoming light beam 308. Optical component 310 can be a polarization beam splitter that can be constructed from any of a wide range of materials known in the art including, but not limited to yttrium vanadium oxide ($YVO_4$), lithium niobate (LN or $LiNbO_3$), calcite, α-BBO, rutile, quartz, or $PbMnO_2$.

Optical component 310 in this exemplary configuration has a first component 310a and a second component 310b. Although these components are illustrated as being separate one from another, one skilled in the art will appreciate that first component 310a can contact second component 310b. Optical component 310 can be a Wollaston or Rochon prism.

Generally, optical component 310 functions as a beam splitter because the optical axis of a first component 310a is different from, and generally orthogonal to, the optical axis of a second component 310b. If input light beam 308 is oriented such that the polarization of beam 308 is aligned with the optical axis of component 310a, all of the light is refracted into one of output fibers 318, 320. The fiber receiving the light then has a coupling ratio of 100, while the fiber receiving no light has a coupling ratio of 0. Alternately, if input light beam 308 is oriented such that the polarization of beam 308 is aligned with the optical axis of component 310b, all of the light is refracted into the opposite one of output fibers 318, 320. By rotating the orientation of the optical axis of PM fiber 304, the coupling ratio at output fibers 318, 320 can be adjusted. It is understood that optical component 310 can be any optical device capable of splitting an incoming electromagnetic wave signal into two or more polarized beams.

One skilled in the art will realize that any number of optical components can be introduced into the middle of coupler 300 and still fall within the scope of the present invention. For instance, multiple polarization beam splitters/combiners or multiple birefringent crystals can be used to split input beam 308 into multiple output beams. The coupling ratio of the multiple output beams can then be adjusted by rotating the optical axis of input beam 308 with respect to optical component 310. It is also understood that the coupling ratio can just as easily be adjusted by rotating optical component 310 with respect to a fixed ferrule 302, by rotating both components in opposite directions, or by rotating both components in the same direction, but rotating one more than the other.

Figure 4:
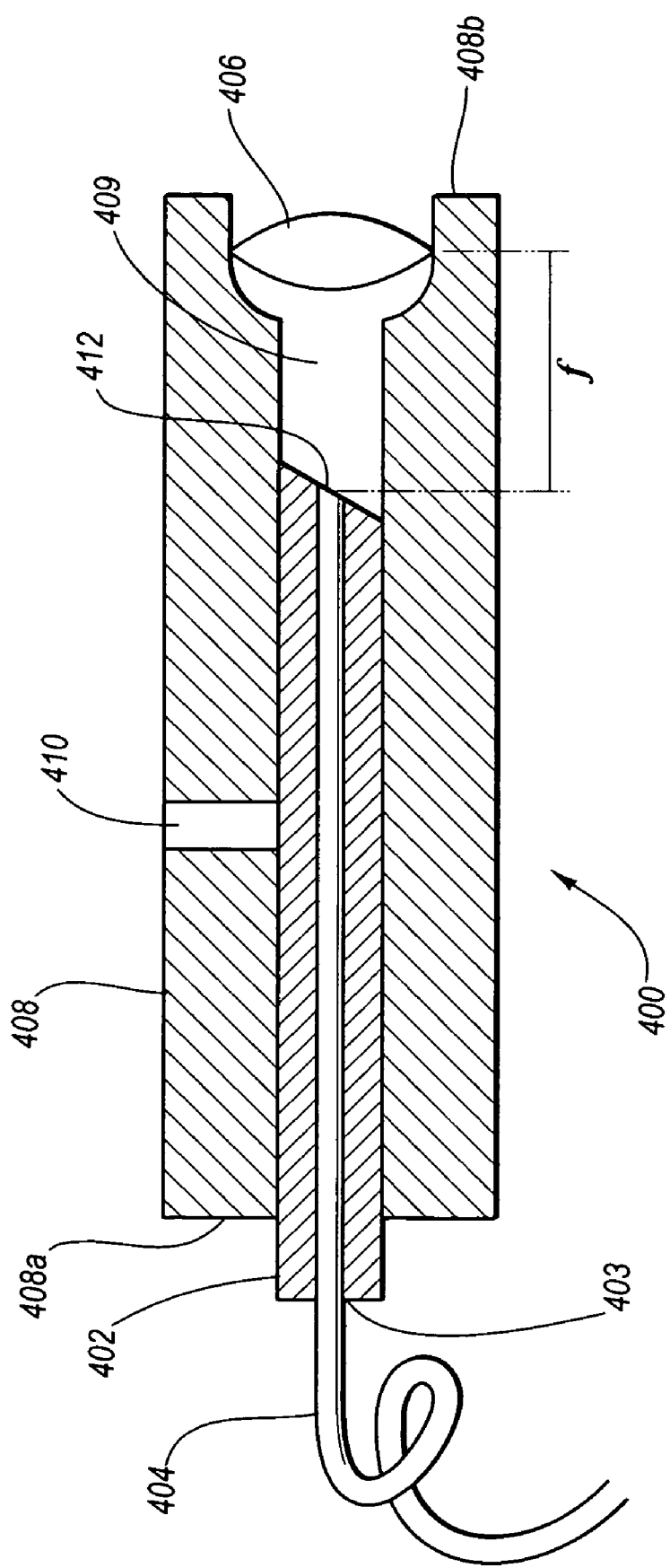
FIG. 4 is a diagram of a polarization maintaining fiber in a ferrule for use in a coupler according to another aspect of the present invention.

Referring now to FIG. 4, a detailed side view of a ferrule assembly in accordance with one aspect of the present invention is shown, and designated generally as 400. Ferrule assembly 400 includes ferrule 402 having a lumen 403 extending from one end to another thereof. Disposed with lumen 403 is PM optical fiber 404. Ferrule 402 is securely held in place within a chamber 409 of a housing 408, at proximal end 408a thereof. A lens 406 is secured within housing 408 near a distal end 408b. More specifically, a distal end of chamber 409 has a diameter to accommodate lens 406. Ferrule 402 can be attached to housing 408 using adhesives, a friction fit, or any other method. However, the attachment method should induce little or no stresses on PM fiber 404 and/or lens 406 that would change the optical axis or optical characteristics of PM fiber 404 or lens 406.

Ferrule 402 can have an optical axis indicator, such as a dotted line or stripe on an exterior surface (not shown). This dotted line or stripe can be used to orient ferrule 402 within housing 408 as a user views the dotted line or stripe through a window 410 in housing 408, and moves the line or stripe to an optional aligning line or stripe on housing 408. This provides an external indicator of the optical axis that allows the axis to be rotated, for example, to a predetermined angle to achieve a desired coupling ratio in optical coupler 300. In other configurations, ferrule 402 includes indicators around the optical axis of PM fiber 404.

PM fiber 404 can have an angled endface 412. Cutting endface 412 at an angle decreases the amount of light reflected back into fiber 404 from endface 412. Endface 412 can be cut at an angle from about 5 degrees to about 15 degrees. In one exemplary embodiment, an angle of about 8 degrees is used. Endface 412 can also have an anti-reflective coating applied thereto to further reduce the amount of light reflected back into fiber 404. Endface 412 can be set back from lens 406 a distance f, which is the focal length of lens 406. This allows lens 406 to collimate and/or focus light coming from endface 412 of PM fiber 404 onto other optical components. Such other components can include a PBS, a polarization beam combiner, a wave guide, or other optical components.

The structure of the invention provides several advantages over the prior art. The modular approach allows the input PM fiber to be rotated relative to the rest of the system, resulting in a tunable coupling ratio. By comparison, the coupling ratio of traditional fused biconic PM couplers cannot be varied once the two fibers are fused together. The structure also has a higher extinction ratio when compared with a fused fiber polarization maintaining coupler because of less stress applied to the PM fiber. A higher extinction ratio is desirable since it implies lower insertion losses for a specific state of polarization and also higher signal to noise ratios.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical coupler comprising:
    an input polarization maintaining (PM) optical fiber having a polarization axis;
    at least one optical component optically coupled to said input optical fiber, said at least one optical component splitting an input light beam received from said input optical fiber into a first output light beam having a first polarization state and a second output light beam having a second polarization state; and
    at least a first and a second output optical fiber to receive said first and second output light beams, respectively;
    wherein rotation of said at least one optical component with respect to said input fiber, while said at least one optical component remains fixed with respect to said output fibers, changes an angular orientation of said polarization axis relative to an optical axis of said at least one optical component, and said rotation changes a coupling ratio while maintaining a low insertion loss.

2. The optical coupler of claim 1, wherein said optical component is a polarization beam splitter.

3. The optical coupler of claim 2, wherein said polarization beam splitter is a crystal pair selected from the group consisting of: yttrium vanadium oxide, lithium niobate, calcite, α-BBO, Quartz and rutile.

4. The optical coupler of claim 1, wherein said optical component is one of a birefringent crystal, a Wollaston prism and a Rochon prism.

5. The optical coupler of claim 1, wherein said input fiber is mounted in a ferrule.

6. The optical coupler of claim 5, wherein said ferrule is mounted in a housing and said housing further holds a lens to focus said input beam into said optical component.

7. The optical coupler of claim 6, wherein said input fiber has an endface cut at an angle.

8. The optical coupler of claim 7, wherein said angle is between about 5 degrees and about 15 degrees and wherein said angle is aligned with an optical axis of said PM fiber.

9. The optical coupler of claim 5, wherein said ferrule is mounted in a housing and said housing further holds a lens to collimate said input beam into said optical component.

10. The optical coupler of claim 1, further comprising a lens optically coupled to said input polarization maintaining fiber, said lens focusing said first and second output beams from said optical component onto said first and second output fiber, respectively.

11. The optical coupler of claim 1, further comprising a plurality of optical components configured to split said input light beam into a plurality of output light beams, each of said plurality of output light beams being focused onto a plurality of output fibers, respectively.

12. The optical coupler of claim 1 wherein each of said first and second output fibers are one of a polarization maintaining fiber and a single mode fiber.

13. An optical coupler comprising:
an input polarization maintaining (PM) optical fiber having a polarization axis;
at least one optical component optically coupled to said input optical fiber, said at least one optical component configured to split an input light beam received from said input optical fiber into a first output light beam having a first polarization state and a second output light beam having a second polarization state, wherein changing an angular orientation of said polarization axis relative to an optical axis of said at least one optical component changes a coupling ratio; and
at least a first and a second output optical fiber to receive said first and second output light beams, respectively, and said optical component and said first and second output fibers are capable of being rotated together with respect to said input fiber to change said coupling ratio.

14. An optical coupler comprising:
an input polarization maintaining optical fiber, said input fiber being contained in a ferrule, said ferrule being housed in a housing;
at least one optical component optically coupled to said input fiber, said at least one optical component splitting an input light beam into a first output light beam and a second output light beam; and
at least a first and a second output optical fiber to receive said first and second output light beams, respectively;
wherein rotation of one of said input polarization maintaining fiber and said at least one optical component with respect to the other, while said at least one optical component remains fixed with respect to said output fibers, changes a coupling ratio while maintaining a low insertion loss.

15. The optical coupler of claim 14, wherein said housing further holds a lens to focus said input beam into said optical component.

16. The optical coupler of claim 15, wherein said input fiber has an endface cut at an angle.

17. The optical coupler of claim 16, wherein said angle is between about 5 degrees and about 15 degrees and wherein said angle is aligned with an optical axis of said PM fiber.

18. The optical coupler of claim 14, wherein said housing further holds a lens to collimate said input beam into said optical component.

19. The optical coupler of claim 14, further comprising a lens to focus said first and second output beams from said optical component onto said first and second output fiber, respectively.

20. The optical coupler of claim 14, further comprising a plurality of optical components that are configured to split said input light beam into a plurality of output light beams, each of said plurality of output light beams being focused onto a plurality of output fibers, respectively.

21. The optical component of claim 14 wherein said housing contains a window showing an orientation of an optical axis of said polarization maintaining fiber.

22. A method of adjusting a coupling ratio, the method comprising:

receiving an input light beam from an input polarization maintaining optical fiber;
splitting said input light beam into at least a first output light beam and a second output light beam using an optical component;
optically coupling said first and second output light beams to a first and second output fiber, respectively; and
rotating one of said input polarization maintaining optical fiber and said optical component with respect to the other, while said at least one optical component remains fixed with respect to said output fibers, so as to change a coupling ratio while maintaining a low insertion loss.

23. The method of claim 22, wherein said optical component is a polarization beam splitter.

24. The method of claim 23, wherein said polarization beam splitter is a crystal pair selected from any one of: yttrium vanadium oxide, lithium niobate, calcite, α-BBO, Quartz, and rutile.

25. The method of claim 22, wherein said input fiber is mounted in a ferrule, and said ferrule is mounted in a housing.

26. The method of claim 25, wherein said housing further holds a lens to focus said input beam into said optical component.

27. The method of claim 26, wherein said input fiber has an endface and wherein said endface is cut at an angle.

28. The method of claim 27, wherein said angle is between about 5 degrees and about 15 degrees and wherein said angle is aligned with an optical axis of said polarization maintaining fiber.

29. The method of claim 25, wherein said housing further holds a lens to collimate said input beam into said optical component.

30. The method of claim 22, further comprising a lens to focus said first and second output beams from said optical component onto said first and second output fiber, respectively.

31. The method of claim 22, further comprising a plurality of optical components that split said input light beam into a plurality of output light beams, each of said plurality of output light beams being focused onto a plurality of output fibers, respectively.

32. The method of claim 31, wherein at least one of said output fibers is a polarization maintaining fiber.

33. The method of claim 31, wherein at least one of said output fibers is a single mode fiber.

34. The method of claim 22, wherein said input polarization maintaining optical fiber is rotated relative to said optical component.

35. The method of claim 22, wherein said optical component is rotated relative to said input polarization maintaining optical fiber.

36. The method of claim 22, wherein said input polarization maintaining optical fiber and said optical component are rotated in opposite respective directions.

37. The method of claim 22, wherein said input polarization maintaining optical fiber and said optical component are rotated in the same direction.

* * * * *

UNITED STATES PATENT AND TRADEMARK OFFICE
CERTIFICATE OF CORRECTION

PATENT NO. : 7,373,028 B2
APPLICATION NO. : 10/693613
DATED : May 13, 2008
INVENTOR(S) : He et al.

It is certified that error appears in the above-identified patent and that said Letters Patent is hereby corrected as shown below:

Column 2
Line 23, change "and outputs oz each" to --and outputs each--

Column 6
Line 25, change "splitting" to --configured to split--

Column 7
Line 29, change "splitting" to --configured to split--

Signed and Sealed this

Twentieth Day of July, 2010

David J. Kappos
*Director of the United States Patent and Trademark Office*